May 27, 1924.
P. J. SMITH
1,495,816
JOINTER FEED MEANS
Filed Oct. 31, 1922
5 Sheets-Sheet 1
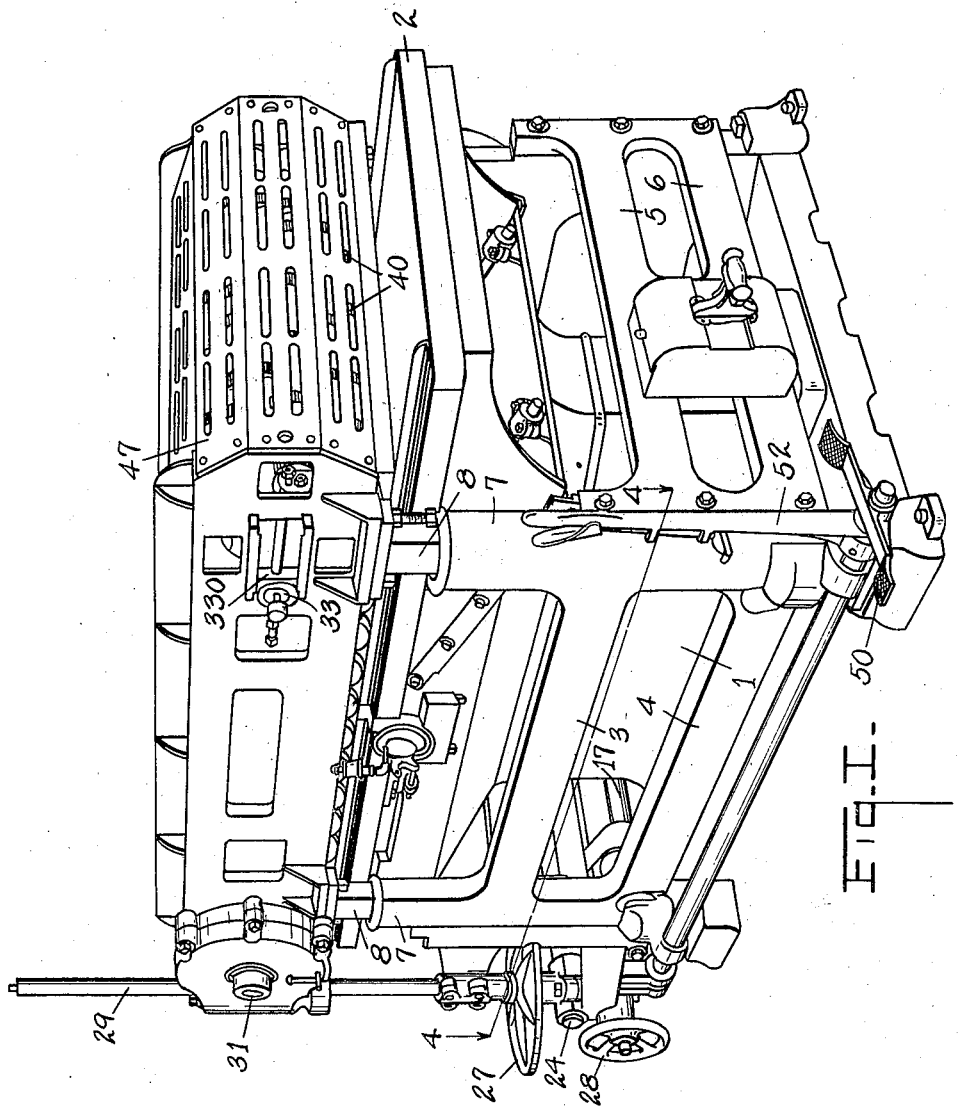
Inventor
Philip J. Smith
By Chappell & Earl
Attorneys

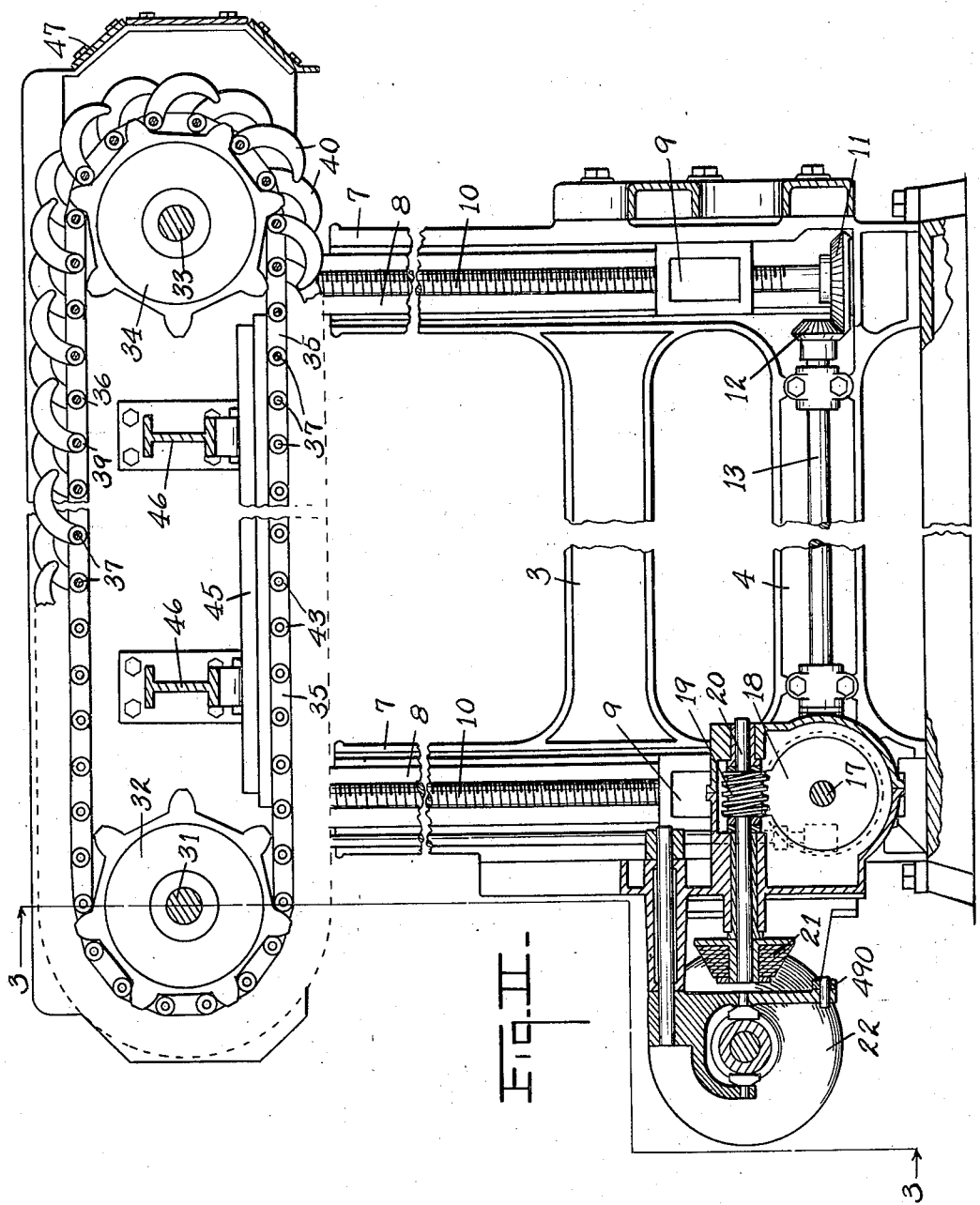

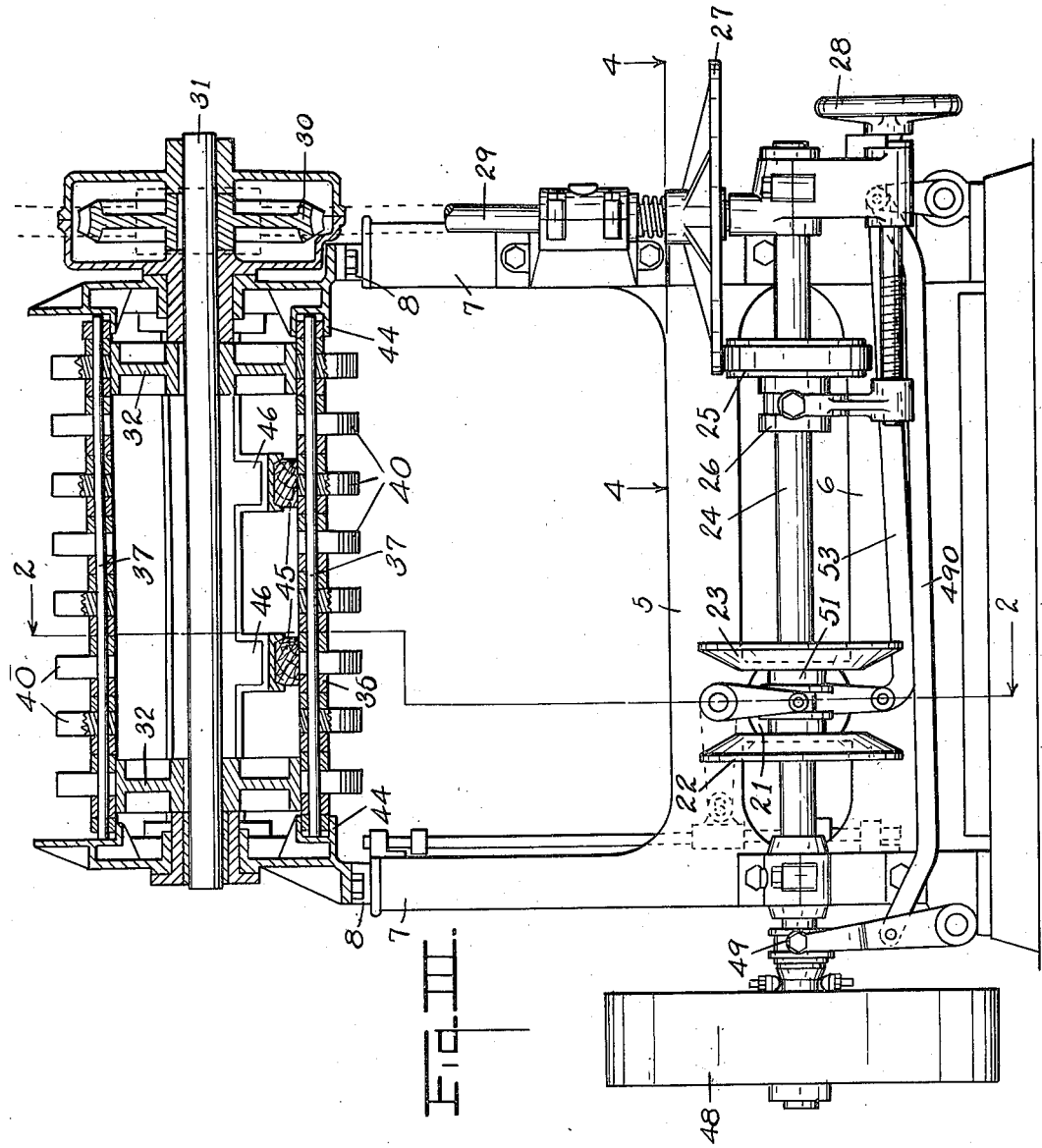

May 27, 1924.
P. J. SMITH
JOINTER FEED MEANS
Filed Oct. 31, 1922
1,495,816
5 Sheets—Sheet 4
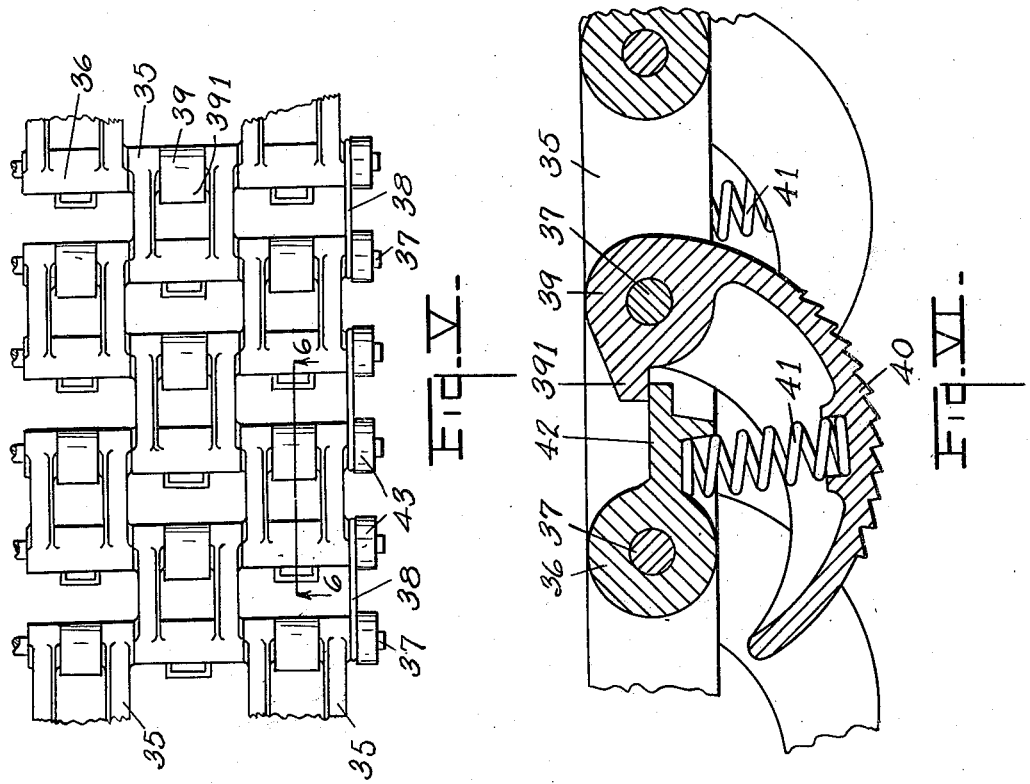
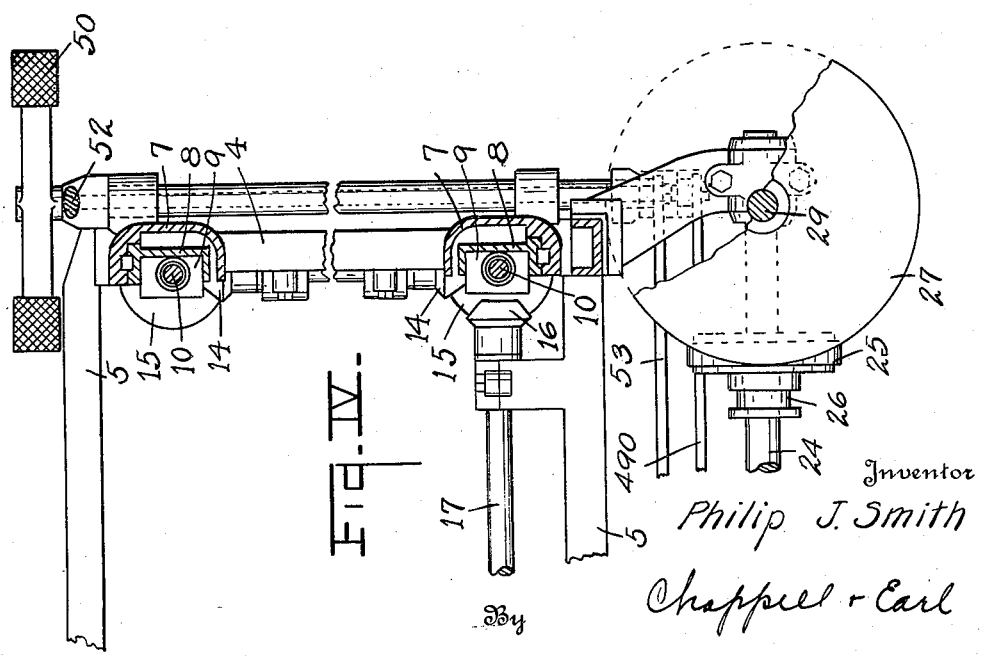
Inventor
Philip J. Smith
By Chappell + Earl
Attorneys

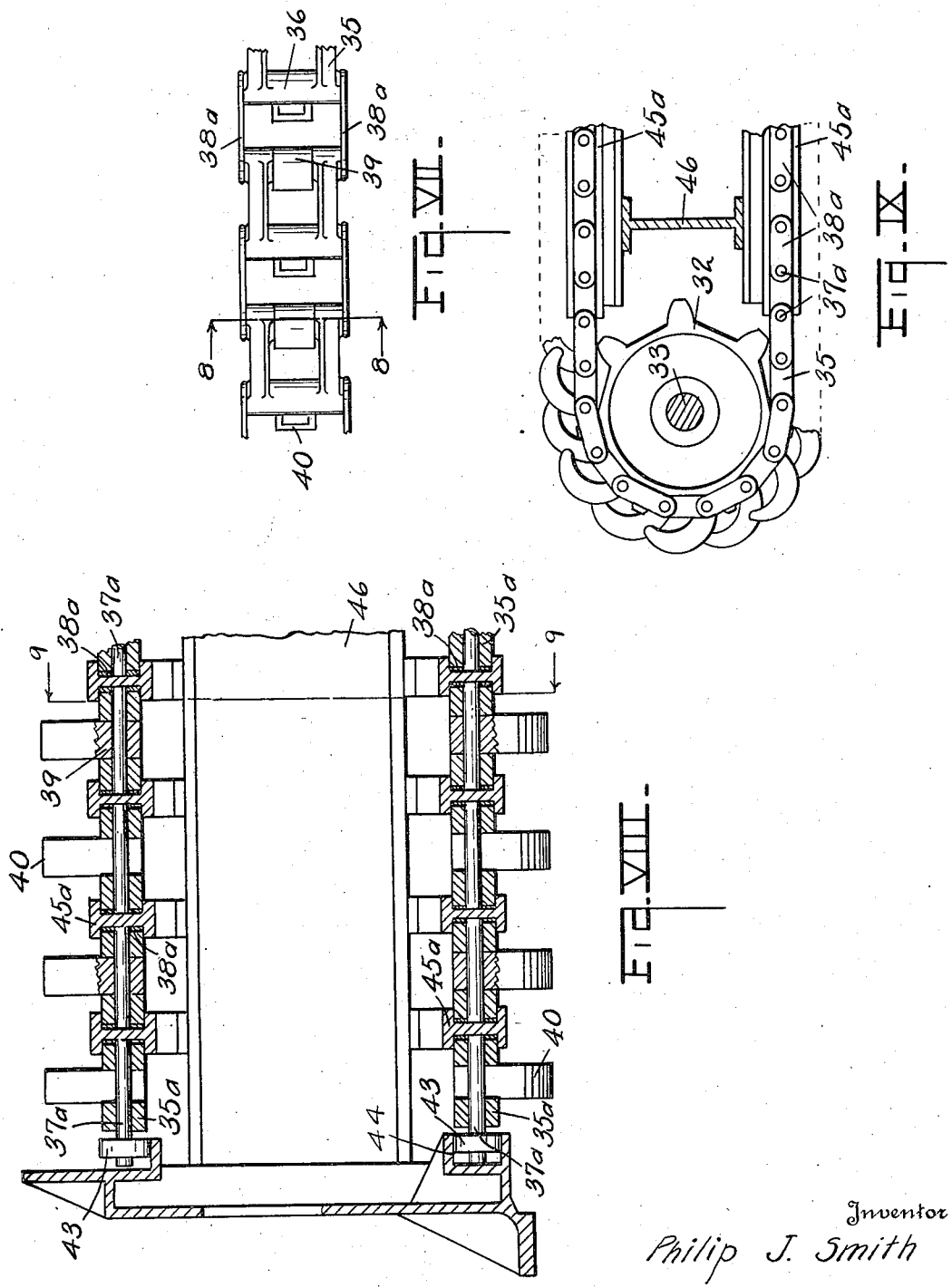

Patented May 27, 1924.

1,495,816

UNITED STATES PATENT OFFICE.

PHILIP J. SMITH, OF SAGINAW, MICHIGAN.

JOINTER FEED MEANS.

Application filed October 31, 1922. Serial No. 598,107.

*To all whom it may concern:*

Be it known that I, PHILIP J. SMITH, a citizen of the United States, residing at Saginaw, county of Saginaw, State of Michigan, have invented certain new and useful Improvements in Jointer Feed Means, of which the following is a specification.

This invention relates to improvements in jointer feed means.

The objects of the invention are:

First, to provide an improved construction of adjustable frame means.

Second, to provide in connection with such adjustable frame means improved feed means.

Third, to provide an improved broad chain and feed dog means in conjunction with suitable supporting means for the chain to insure effective operation of the feed dogs.

Fourth, to provide an improved construction of chain link and feed dog combined.

Objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a detail perspective view of my improved jointer feed in position over a jointer planer, taken from the receiving end and left hand side, showing the pedal control for the feed and the lever control for the raising and lowering means.

Fig. II is a detail sectional elevation view taken on line 2—2 of Fig. III.

Fig. III is a detail longitudinal sectional view, parts being in full line elevation, taken on line 3—3 of Fig. II.

Fig. IV is a detail horizontal sectional view taken on line 4—4 of Fig. III.

Fig. V is a detail view of a portion of chain and feed finger, taken from the top side of the under run of the chain, the same being somewhat enlarged.

Fig. VI is an enlarged detail sectional view taken on line 6—6 of Fig. V, showing details of construction of the feed dogs and links.

Fig. VII is a detail view of a single chain structure.

Fig. VIII is a detail view of a slight modification of my structure, where a series of single chains is used as distinguished from the broad chain in the preferred construction.

Fig. IX is a detail sectional view taken on line 9—9 of Fig. VIII, showing details of one of the single chains and wheels.

In the drawing similar reference numerals refer to similar parts throughout the several views and the sectional views are taken looking in the direction of the little arrows at the ends of the section lines.

Considering the numbered parts of the drawing by their numbers, 1 is the base of a jointer planer, having a table 2, seen in Fig. I. Around this planer is disposed the framework of my improved structure consisting of the side rails 3, 4 and the end rails 5, 6, having corner posts 7 which are of channel or hollow form, which contain adjustable posts 8 which are carried up and down by screws 10 through the screw threaded supporting base block 9. The screws 10 are actuated by bevel gears 11 driven by pinions 12 on the shafts 13, which shafts 13 are provided with pinions 14 intermeshing with gears 15 which carry the opposite sets of screws 10. The gears 15 are driven by pinions 16 on shafts 17, which shafts 17 are driven by worm gear 18 driven by the worm 19 on shaft 20, which is driven by the friction pinion 21, which pinion is operated by the driving friction disks 22 and 23 alternately as the same are adjusted by means hereafter to be described.

The friction disks are splined to the driving shaft 24. The shaft 24 drives the friction gear 25 which is splined by collar 26 to the shaft 24 and drives the friction disk 27, the speed being regulated by the hand screw 28 which adjusts the friction driving gear 25 along this splined shaft 24. The vertical shaft 29 is thus driven at any desired speed and is splined to drive the worm gear 30 on the driven shaft 31, which driven shaft 31 carries a series of sprocket gears 32 which cooperate with the shaft 33 carrying the sprocket wheels 34. Tension means 330 is provided for the said shaft 33.

A broad sprocket chain 35, made up of a series of links 36 pivoted together on the elongated pivot 37 which are connected at their outer ends by link 38—see Fig. V, carries the feed dogs 40 which are held yieldingly down by the spring 41 disposed under a suitable lug 42. A projecting stop 391 is on the dog to maintain the same in proper elevation in relation to the chain.

On the ends of the chain pintles 37 are disposed rollers 43 to travel in suitable longitudinal channel-shaped guideways 44,—see Fig. III. The chain is held down in position and not permitted to flex upwardly by the hold-down shoes 45 carried on the beams 46, the position of the shoes being such as to prevent the chain from bending out of feeding position.

The drive shaft 24 is here driven by the pulley 48 and is provided with a clutch 49 which is controlled by the cross arm pedal on a suitable rock shaft and connected to the clutch by the connection rod 490.

Splined hub 51 carries the friction disks 22, 23, which are controlled by the hand lever 52 connected thereto by the connection 53, whereby the raising and lowering of the feed device is controlled.

The operation of the improved structure will be readily understood. When the feed is thrown into gear, the sprocket gears and shafts will be actuated and the chain 35 will be carried forward and the toothed dogs 40 will engage into any lumber or blocks that are on the feed table of the planer or jointer and the same will be carried forward. The chain is prevented from flexing by the hold-down shoes 45 and the work is carried regularly and smoothly over the planer table.

In place of the broad chains, chains which are a single link wide may be used, as seen in Figs. VII, VIII and IX, in which event the hold-down shoes are replaced by suitable hold-down guides 45ª carried by a beam 46, as seen in Fig. VIII. The links of the chain are precisely the same as the links of the broad chain, and the channels are provided to prevent the single chains from sagging. The operation is the same and each link is definitely and effectively supported by the hold-down and is effectively guided into position thereby.

Having described my invention, I desire to state that from the details shown it is clear the same is capable of considerable modification. By producing the structure in this way the links are identical and consequently lend themselves readily to manufacture. It is possible to make up units of the structure very easily by the usual machine shop methods.

Having thus described my invention, what I claim as new and desire to secure by Letters Patent, is:

1. In a jointer planer, the combination of a suitable frame with channel-shaped corner posts connected by suitable side and end rails, guideways in the said corner posts, vertically adjustable posts with guide ends fitted into said channeled ways, vertical screws for adjusting the same, connections for driving the said screws, a supporting frame carried by said adjustable posts, with opposed pairs of sprocket wheels therein, a broad sprocket chain made up of parallel links embracing the said wheels, yielding feed dogs carried by the separate links of said chain and pivoted on the pintles of said chain and projecting outwardly and downwardly to engage the work on the table of the jointer planer, suitable means for driving said sprocket, all coacting substantially as described for the purpose specified.

2. A feed chain for a jointer planer comprising a series of parallel links of double bar construction, a curved feed dog journaled to the chain pintles between the side of the bars of said links and provided with a projecting stop, and a corresponding stop on the connection between the bars at the opposite end of said link for limiting the downward movement thereof, and a spring interposed beneath the said projecting stop and the top of said feed dog to hold the same yieldingly in position, as specified.

3. A sprocket feed chain for a jointer planer comprising links having side bars connected at one end by a rigid part provided with a rearward projection to form a stop and a spring abutment, a pivoted curved serrated feed dog disposed on the chain pintle between the opposite ends of said side bars, and a stop for limiting its downward movement, and a spring between the said lug and the said feed dog, coacting as specified.

4. A sprocket feed chain for a jointer planer consisting of links having side bars connected at one end by a rigid part provided with a rearward projection to form a stop and a spring abutment, a pivoted curved serrated feed dog disposed on the chain pintles between the opposite ends of said side bars, and a stop for limiting its downward movement, coacting as specified.

5. A sprocket feed chain or belt for a jointer feeder comprising a series of parallel links disposed in alternate relation with transverse pintles therethrough, each link comprising said bars connected at one end by a rigid part provided with a rearward projection to form a stop and spring abutment, pivoted curved serrated feed dogs disposed on the chain pintles between the opposite ends of said link side bars provided with projecting finger stops for limiting their downward movement, and with springs between the abutment and the said feed dogs to hold the same yieldingly downward against said stops, coacting as specified.

6. A sprocket feed chain or belt for a jointer feeder comprising a series of parallel links disposed in alternate relation with transverse pintles therethrough, each link comprising side bars connected at one end by a rigid part provided with a rearward projection to form a stop, pivoted curved serrated feed dogs disposed on the chain pintles between the opposite ends of said link side bars provided with projecting finger stops for limiting their downward movement, coacting as specified.

In witness whereof I have hereunto set my hand and seal.

PHILIP J. SMITH. [L. S.]